US010016865B2

(12) United States Patent
Linder et al.

(10) Patent No.: US 10,016,865 B2
(45) Date of Patent: Jul. 10, 2018

(54) POSITIONING WORKPIECES BY CLAMPING DEVICES

(71) Applicant: TRUMPF Werkzeugmaschinen GmbH + Co. KG, Ditzingen (DE)

(72) Inventors: Bernd Linder, Gammertingen (DE); Torsten Popp, Krauchenwies (DE); Bernd Gaiser, Verigendorf (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 472 days.

(21) Appl. No.: 14/325,435

(22) Filed: Jul. 8, 2014

(65) Prior Publication Data

US 2015/0020372 A1 Jan. 22, 2015

(30) Foreign Application Priority Data

Jul. 17, 2013 (DE) .......................... 10 2013 214 019

(51) Int. Cl.
*B23Q 3/06* (2006.01)
*B23Q 3/08* (2006.01)
(Continued)

(52) U.S. Cl.
CPC .......... *B23Q 3/08* (2013.01); *B23B 31/16125* (2013.01); *B23B 31/16141* (2013.01);
(Continued)

(58) Field of Classification Search
CPC .......... B23B 2231/14; B23B 2270/027; B23B 31/16125; B23B 31/16141; B23K 37/053;
(Continued)

(56) References Cited

U.S. PATENT DOCUMENTS 1,962,567 A * 6/1934 Lovejoy .................. B23Q 3/08
269/218
2,219,742 A * 10/1940 Haversack ........... B23K 37/053
269/20
(Continued)

FOREIGN PATENT DOCUMENTS

DE 202009013226 U1 * 12/2009 ........... B23B 31/101
DE 102010003807 A1 * 10/2011 ........... B23Q 17/003
(Continued)

OTHER PUBLICATIONS

Japanese Office Action for Japanese Patent Application No. 2014-145858 dated Feb. 27, 2018 (9 pages).

*Primary Examiner* — Joseph J Hail
*Assistant Examiner* — Arman Milanian
(74) *Attorney, Agent, or Firm* — Fish & Richardson P.C.

(57) ABSTRACT

Methods, devices, and systems for positioning workpieces for processing. In one aspect, a clamping device includes two clamping elements and a servo drive provided for the clamping elements. The servo drive is operable to first move at least one of the clamping elements toward the other of the clamping elements such that the clamping elements are transferred into a clamping start position in which the clamping elements are positioned on opposite sides of a workpiece arranged therebetween and in which the clamping elements do not apply a force to the workpiece or apply a force to the workpiece that is smaller than a clamping force, and subsequently urge the clamping elements toward one another from the clamping start position to an operational state, in which the clamping elements apply the clamping force to the workpiece.

22 Claims, 4 Drawing Sheets

(51) Int. Cl.
  *B25B 5/06* (2006.01)
  *B25B 5/14* (2006.01)
  *G05D 15/01* (2006.01)
  *B23Q 17/00* (2006.01)
  *B23B 31/171* (2006.01)

(52) U.S. Cl.
  CPC .............. *B23Q 3/06* (2013.01); *B23Q 3/064* (2013.01); *B23Q 17/00* (2013.01); *B25B 5/061* (2013.01); *B25B 5/147* (2013.01); *G05D 15/01* (2013.01); *B23B 2231/14* (2013.01); *B23B 2270/027* (2013.01); *Y10T 29/49998* (2015.01)

(58) Field of Classification Search
  CPC .......... B23Q 17/00; B23Q 3/06; B23Q 3/064; B23Q 3/08; B25B 1/20; B25B 5/061; B25B 5/147; G05D 15/01; Y10T 29/49998
  USPC .................................................. 29/235–238
  See application file for complete search history.

(56) References Cited

U.S. PATENT DOCUMENTS

| | | | | |
|---|---|---|---|---|
| 2,428,185 A * | 9/1947 | Wallace | ............... | B27B 29/00 269/30 |
| 2,536,602 A * | 1/1951 | Goett | ............... | F16L 37/1205 269/221 |
| 2,624,318 A * | 1/1953 | Walder | ............... | F15B 11/076 188/289 |
| 2,737,140 A * | 3/1956 | Totten | ............... | B23K 37/0533 219/161 |
| 2,800,867 A * | 7/1957 | Smith | ............... | B23K 37/0533 269/152 |
| 3,131,586 A * | 5/1964 | Wilson | ............... | E21B 19/16 74/364 |
| 3,544,117 A * | 12/1970 | Bingham | ............. | B23B 31/026 279/133 |
| 3,605,238 A * | 9/1971 | Eschholz | ............. | B23P 19/084 29/235 |
| 4,116,015 A * | 9/1978 | Duncan | ................. | E21B 33/038 24/458 |
| 4,176,269 A * | 11/1979 | Merrick | ............... | B23K 9/0286 219/161 |
| 4,403,897 A * | 9/1983 | Willis | ................... | E21B 19/155 269/238 |
| 5,037,262 A * | 8/1991 | Moll | ................. | H01L 21/67126 118/503 |
| 5,139,246 A | 8/1992 | Yakou | | |
| 5,330,168 A * | 7/1994 | Enomoto | ............... | B23Q 3/069 269/329 |
| 6,121,781 A * | 9/2000 | Martinez | ................. | B21J 15/10 324/658 |
| 6,253,030 B1 * | 6/2001 | Miyauchi | ................. | G03B 9/22 396/195 |
| 6,828,522 B2 * | 12/2004 | Hochhalter | .......... | B23K 11/253 219/86.32 |
| 8,561,975 B2 * | 10/2013 | Liu | ........................ | B25H 1/02 269/32 |
| 8,777,199 B2 * | 7/2014 | Webb | .................... | E21B 19/161 269/25 |
| 2007/0271753 A1 * | 11/2007 | Haag | ................. | B23B 31/16241 29/235 |
| 2009/0134561 A1 * | 5/2009 | Wang | ....................... | B23Q 1/76 269/86 |
| 2010/0244345 A1 * | 9/2010 | Hirakawa | ................ | B25B 1/18 269/35 |
| 2011/0304108 A1 * | 12/2011 | Robb | ..................... | B23B 31/36 279/126 |

FOREIGN PATENT DOCUMENTS

| | | | | |
|---|---|---|---|---|
| DE | 102010003807 B4 | | 1/2013 | |
| EP | 0108857 A2 * | | 5/1984 | ............ B23Q 1/0009 |
| EP | 0264078 A2 * | | 4/1988 | ............... B25B 1/18 |
| EP | 0999004 A2 * | | 5/2000 | ............ B23B 31/18 |
| JP | H 07-24680 | | 1/1995 | |
| JP | 2004-017193 | | 1/2004 | |
| WO | WO 2007091021 A1 * | | 8/2007 | ............. B23B 1/101 |
| WO | WO 2010018409 A2 * | | 2/2010 | ............. B23B 31/36 |

* cited by examiner

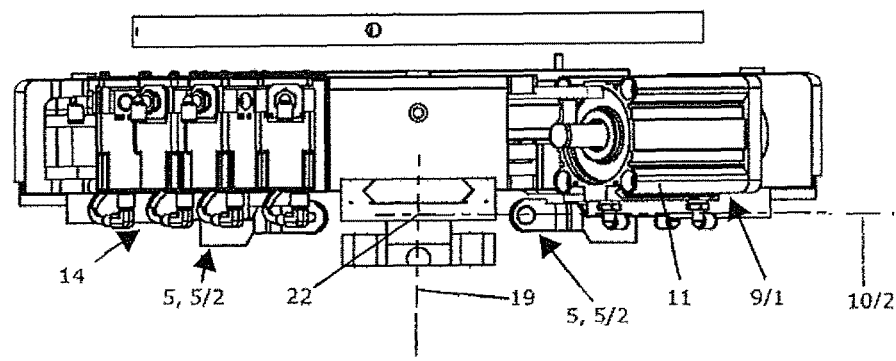
Fig. 4
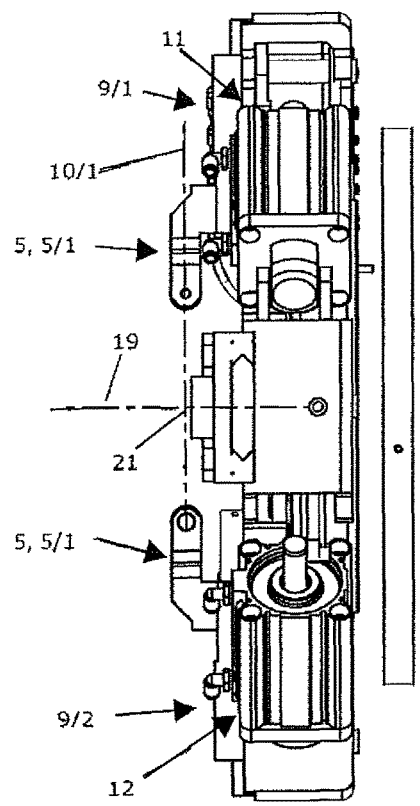 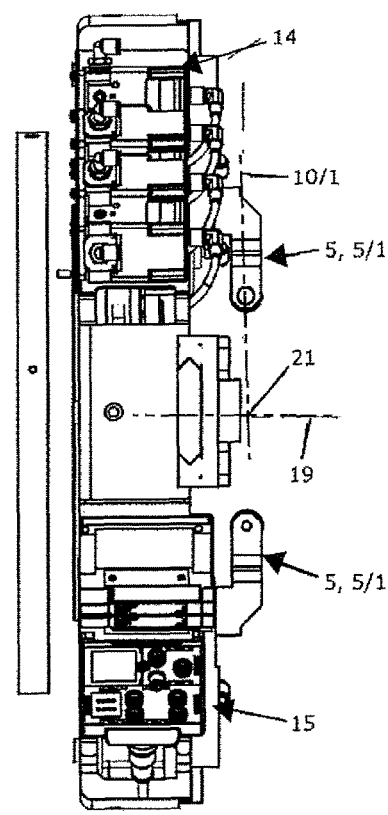
Fig. 5        Fig. 6

POSITIONING WORKPIECES BY CLAMPING DEVICES

CROSS REFERENCE TO RELATED APPLICATION

This application claims priority under 35 U.S.C. § 119 to German Application No. DE 10 2013 214 019.3 filed on Jul. 17, 2013. The content of this priority application is hereby incorporated by reference in its entirety.

TECHNICAL FIELD

The present invention relates to methods, devices, and systems for positioning workpieces with respect to a processing device of a machine tool for processing the workpieces.

BACKGROUND

A tube processing machine has a clamping chuck for clamping a tube that is to be processed. The clamping chuck has clamping jaws which are moved by electric, pneumatic or hydraulic actuators in the radial direction of a clamping centre of the clamping chuck from a non-operational position into an operational position in which the clamping jaws clamp a tube arranged between them. Pressure sensors on the clamping jaws serve to regulate the forces exerted on the tube in question by the clamping jaws in the operational position.

SUMMARY

Described below are methods, devices, and systems for positioning workpieces with respect to a processing device of a machine tool for processing the workpieces.

One aspect of the invention features a clamping device having two clamping elements and a positioning drive which is provided for the clamping elements and is in the form of a servo drive and by which at least one clamping element can be moved relative to the other clamping element and by which the clamping elements can thus be moved towards one another into an operational position and transferred into an operational state in which the clamping elements, when a workpiece is arranged between the clamping elements, clamp the workpiece between them as a result of the fact that the clamping elements are located opposite one another on the workpiece and each apply a clamping force to the outside of the workpiece along a line of application of the respective clamping force.

Other aspects of the invention feature a machine tool having such a clamping device, and/or a method carried out with such a clamping device, for positioning workpieces with respect to a processing device of a machine tool for processing workpieces.

Another aspect of the invention features a computer program for operating a clamping device of the above type, to a method for writing such a computer program, and to a computer program product for carrying out the mentioned method for writing a computer program.

It is an object of the present invention to permit the particularly gentle clamping of workpieces that are to be processed on a machine tool.

The transfer of two clamping elements of a clamping device for positioning workpieces into an operational state can be divided into at least two phases. The clamping elements are first moved towards one another into a clamping start position by the positioning drive of the clamping device. In the clamping start position, the clamping elements do not apply a force to the workpiece to be clamped or they apply only a force that is reduced in terms of amount compared to the clamping force. With the positioning drive of the clamping device in the form of a servo drive and having one or more electronically controlled drive motors for generating the movement of the clamping elements, the clamping elements are able to attain the clamping start position with great accuracy.

The clamping start position of the clamping elements is chosen in such a manner that the application of too great a force by the clamping elements on the workpiece to be clamped can be ruled out with certainty. This is in any case ensured when there is a clearance between the clamping elements moved into the clamping start position, on the one hand, and the workpiece to be clamped, on the other hand, or when the clamping elements located in the clamping start position touch without force the outside of the workpiece to be clamped. A corresponding clamping start position is chosen for the clamping elements in particular in cases where particularly sensitive workpieces, for example thin-walled and consequently readily deformable tubes, are to be clamped.

However, there is additionally also conceivable a clamping start position of the clamping elements in which the clamping elements each apply to the workpiece to be clamped a comparatively low force along the lines of application of the clamping forces exerted by the clamping elements in the operational state. Such a clamping start position is provided in particular when the workpiece to be clamped possesses sufficient stiffness and consequently withstands the application of force by the clamping elements moved into the clamping start position without being undesirably deformed.

In any case, the clamping elements are urged towards one another, starting from the clamping start position, by the positioning drive of the clamping device and thereby transferred into the operational state. In the last phase of their transfer into the operational state too, the clamping elements are driven with great positioning accuracy by the positioning drive in the form of a servo drive. By the positioning drive in the form of a servo drive it can be ensured in particular that the clamping forces exerted by the clamping elements on the workpiece to be clamped build up gently, that is, continuously and comparatively slowly. The clamping elements are thus reliably prevented from exerting excessive force on the workpiece to be clamped.

The two mutually associated clamping elements form a clamping element pair and are preferably driven together by a single drive motor, synchronously and in opposite directions.

Automation of the clamping device and of a method for positioning workpieces may be achieved by a computer program. The computer program is run on a numerical control device of the clamping device, the numerical control device suitably controlling the positioning drive provided for the clamping elements. A computer program product enables a user to generate in situ the computer program for the application-related control of the clamping device and of the method for positioning workpieces.

In some implementations, the clamping elements can be moved into a clamping start position in which there is a clearance between the clamping elements, on the one hand, and the workpiece to be clamped, on the other hand, along the lines of application of the clamping forces exerted by the clamping elements in the operational state. Because, in the clamping start position, at least one of the two mutually opposing clamping elements accordingly maintains a distance from the workpiece to be clamped, and the clamping start position of the clamping elements can be adjusted comparatively roughly and vary at least in narrow limits. Control of the movement of the clamping elements into the clamping start position can consequently be carried out with a comparatively low outlay. A precise determination of the clamping start position of the clamping elements is required, since the clamping start position of the clamping elements forms the basis for the transfer of the clamping elements into the operational state. The operational state is established in that the clamping elements are moved towards one another with high accuracy into an operational position associated with the operational state by the positioning drive in the form of a servo drive.

In order to minimize the time required for positioning a workpiece with respect to the processing device, the movement of the two clamping elements into the clamping start position may be executed at a higher speed than the movement of the clamping elements from the clamping start position into the operational position.

Different parameters can be used for controlling or regulating the positioning drive provided for the clamping elements of the clamping device. In some examples, the positioning drive of the clamping elements has a control device which controls the positioning drive in a force- and/or position-dependent manner for moving the clamping elements into the clamping start position and/or for transferring the clamping elements into the operational state.

In some cases, the workpiece clamped by the clamping device is to be moved with respect to the processing device of the associated machine tool. In some other cases, the clamping elements of the clamping device are provided on a movable, preferably rotatable, carrying structure. In a variant of the clamping device, at least part of the positioning drive, in particular a servomotor of the positioning drive, is provided together with the clamping elements on the movable carrying structure. The components in question of the positioning drive, optionally the servomotor or servomotors of the positioning drive, are arranged in the immediate vicinity of the clamping elements that are to be actuated. The carrying structure can form a structural unit which, as well as including the actual clamping system, also includes the associated drive system.

In some implementations, the positioning drive is in the form of a pneumatic servo drive with a pneumatic servomotor, which in particular has a pneumatic piston-cylinder unit. Pneumatic servomotors, in particular pneumatic piston-cylinder units, can be precisely controllable and robust drive units in many applications. The compressed air required as pressure medium can readily be provided and can be supplied to the pneumatic servomotor without problems even in cases where the pneumatic servomotor is arranged on a movable carrying structure of the clamping device and moves relative to a stationary compressed-air generator during operation of the clamping device.

The pneumatic piston-cylinder unit can be arranged on the movable carrying structure of the clamping device, particularly in combination with individual or all of the components for controlling and regulating the pneumatic piston-cylinder unit. If both the pneumatic piston-cylinder unit and the associated control and regulating system are located on the movable carrying structure of the clamping device, the path lengths between the components in question of the control and/or regulating system and the piston-cylinder unit to be controlled or regulated thereby are minimized. Pressure losses, for example, can thus largely be avoided.

In some implementations, a numerical control device of the positioning drive of the clamping device has a device part that is close to the positioning drive and a device part that is remote from the positioning drive. The device part of the numerical control device that is remote from the positioning drive defines at least one operating mode, in accordance with which the device part of the numerical control device that is close to the positioning drive controls the actuating drive for moving the clamping elements of the clamping device into the clamping start position and/or for transferring the clamping elements into the operational position. The described division of the numerical control device of the positioning drive is provided in particular in cases where the motor(s) of the positioning drive that is/are to be regulated with numerical control is/are arranged together with the clamping elements on a movable carrying structure.

In a preferred embodiment, the device part of the numerical control device that is close to the positioning drive is then likewise provided on the movable carrying structure. The movable carrying structure is consequently equipped not only with the apparatuses required for clamping workpieces but additionally also with the control and regulating intelligence required therefor. In cases of the described type, the device part of the numerical control device that is remote from the positioning drive is preferably arranged remote from the movable carrying structure. The entire numerical control device of the positioning drive of the clamping device can be integrated into a higher-level machine control system of the machine tool provided with the clamping device.

Operating modes which can be specified by the device part of the numerical control device that is remote from the positioning drive are, for example, a force-controlled or a displacement- and thus position-controlled actuation of the clamping elements of the clamping device. On the basis of the mode specified by the device part that is remote from the positioning drive, the device part of the numerical control device that is close to the positioning drive controls the positioning drive provided for the clamping elements. Transmission of the control signals between the device part of the numerical control device that is remote from the positioning drive and the device part of the positioning numerical control device that is close to the drive can take place in a wired manner or in a contactless manner using telemetry systems.

The positioning drive of the clamping device can have a numerical control device with a memory in which the clamping start position of the clamping elements can preferably be stored by a teaching operation.

Another aspect of the invention features a workpiece processing system including a workpiece processing device and a workpiece clamping device for positioning a workpiece with respect to the workpiece processing device for processing.

The workpiece clamping device includes two clamping elements and a servo drive. The servo drive is operable to first move at least one of the clamping elements toward the other of the clamping elements, whereby the clamping elements can be transferred into a clamping start position in which the clamping elements are positioned on opposite sides of a workpiece arranged therebetween, and to subsequently urge the clamping elements toward one another from the clamping start position to an operational state, in which the clamping elements apply a clamping force to the workpiece.

When the clamping elements are in the operational state, the clamping elements are located opposite one another on the opposite sides of the workpiece and each apply a respective clamping force to the respective side of the workpiece along a line of application of the respective clamping force. When the clamping elements are in the clamping start position, the clamping elements do not apply a force to the respective side of the workpiece or apply a force along the line of application of the respective clamping force, the force being smaller than the respective clamping force in the operational state.

Another aspect of the invention features a non-transitory computer readable storage medium storing instructions executable by a data processing apparatus and upon such execution cause the data processing apparatus to perform operations for positioning workpieces by a clamping device.

The operations include arranging a workpiece between two clamping elements of a clamping device, the clamping device including a servo drive operable to move one or both of the clamping elements, and operating the servo drive to transfer the clamping elements into an operational state in which the clamping elements are located opposite one another on the workpiece and each apply a respective clamping force to an outside of the workpiece along a line of application of the respective clamping force.

Operating the servo drive includes moving the clamping elements toward one another into a clamping start position in which the clamping elements do not apply a force to the outside of the workpiece or apply a force along the line of application of the respective clamping force, the force being smaller than the respective clamping force in the operational state, and then urging the clamping elements from the clamping start position toward one another into an operational state and increasing a clamping force applied to the workpiece by the clamping elements.

The operations further include executing a computer program on a numerical control device of the clamping device to control the servo drive for at least one of moving the clamping elements into the clamping start position or transferring the clamping elements into the operational state.

Other advantages of the invention will be appreciated from the description and the drawings. The features mentioned above and those set out below may also be used individually per se or together in any combination. The embodiments shown and described are not intended to be understood to be a conclusive listing but are instead of exemplary character for describing the invention.

DESCRIPTION OF DRAWINGS

FIG. 4 shows a view of the clamping device according to FIGS. 1 and 2 in the direction of arrow IV in FIG. 1.

FIG. 5 shows a view of the clamping device according to FIGS. 1 and 2 in the direction of arrow V in FIG. 1.

FIG. 6 shows a view of the clamping device according to FIGS. 1 and 2 in the direction of arrow VI in FIG. 1.

In the following description of the drawings, identical reference numerals are used for components which are the same or which have the same function.

DETAILED DESCRIPTION

Figure 1:
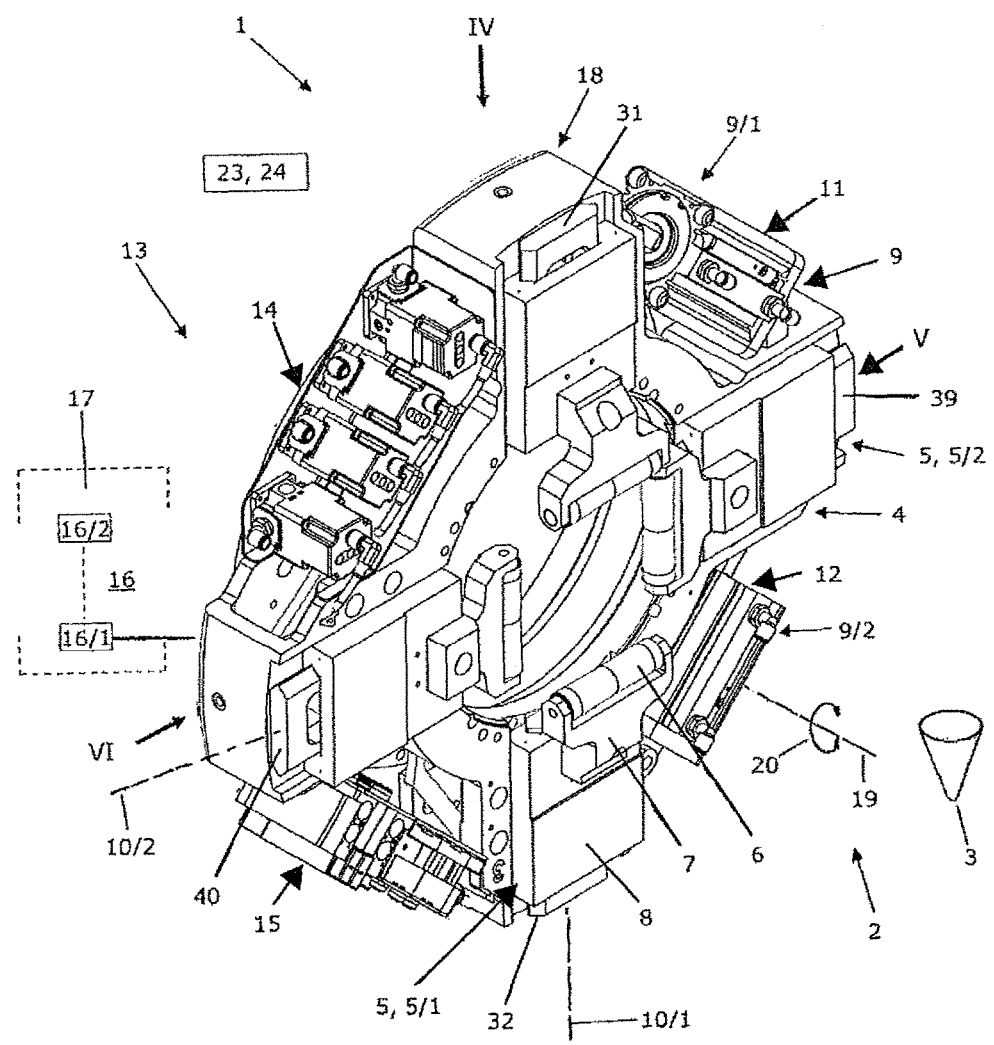
FIG. 1 shows a perspective view of a clamping device for positioning tubes at a tube processing machine, having a clamping chuck comprising four clamping jaws, in an initial state.

According to FIG. 1, a clamping device 1 is part of a machine tool 2 for tube processing. The clamping device 1 serves to position tubes with respect to a processing device, in the example shown with respect to a laser cutting head 3 of the machine tool 2.

Figure 2:
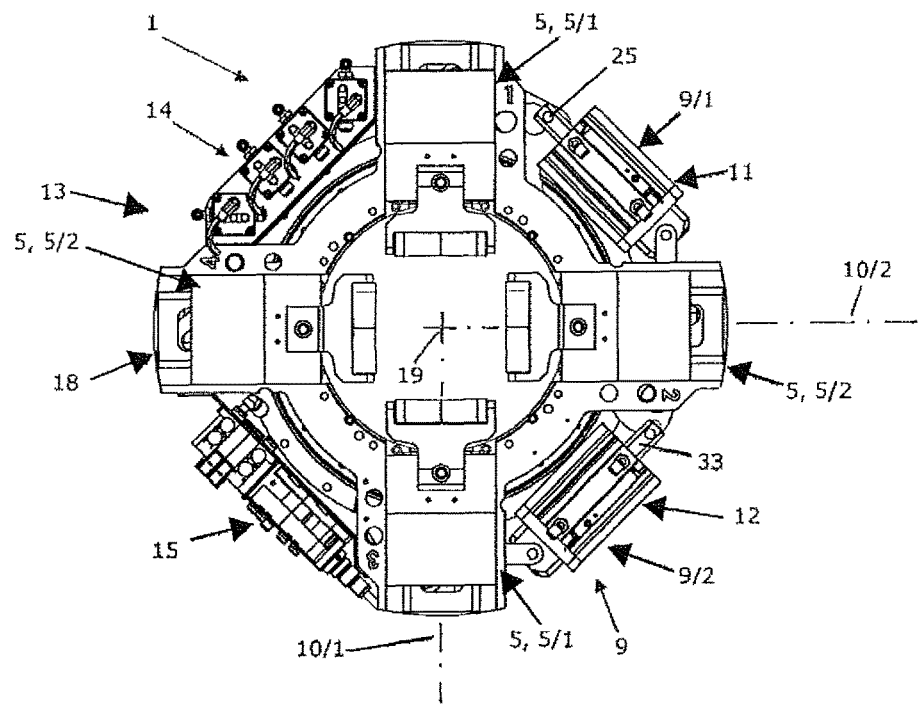
FIG. 2 shows the clamping device according to FIG. 1 in a plan view.

The clamping device 1 has a clamping chuck 4, which in the present case is in the form of a four jawchuck and accordingly comprises as clamping elements a total of four clamping jaws 5 (see also FIG. 2). The clamping jaws 5 are located in pairs opposite one another and consequently form two clamping jaw pairs 5/1, 5/2. Each of the clamping jaws 5 comprises a roll-like clamping body 6, a clamping body holder 7 which rotatably supports the clamping body 6, and a guide slide 8.

By a positioning drive 9 in the form of a servo drive, the clamping jaws 5 of the clamping jaw pair 5/1 can be positioned relative to one another along a clamping axis 10/1 and the clamping jaws 5 of the clamping jaw pair 5/2 can be positioned relative to one another along a clamping axis 10/2. A positioning drive unit 9/1 of the positioning drive 9 serves to actuate the clamping jaws 5 of the clamping jaw pair 5/1. In a corresponding manner, a positioning drive unit 9/2 of the positioning drive 9 is provided for actuating the clamping jaws 5 of the clamping jaw pair 5/2. The lines of application of the forces exerted by the clamping jaws 5 on a tube to be clamped run in the direction of the clamping axes 10/1, 10/2, the forces exerted on the tube in question by the clamping jaws 5 of a clamping jaw pair 5/1, 5/2 being directed in opposite directions to one another and corresponding to one another in terms of amount and line of application.

The positioning drive 9 can be in the form of a pneumatic servo drive. As the drive motor, the positioning drive unit 9/1 comprises a pneumatic piston-cylinder unit 11 and the positioning drive unit 9/2 comprises a pneumatic piston-cylinder unit 12.

A control and/or regulating device 13 of the positioning drive 9 is associated with both positioning drive units 9/1, 9/2. The control and/or regulating device 13 comprises in the conventional manner a pressure regulating unit 14 as well as a valve unit 15. The pressure regulating unit 14 and the valve unit 15 together ensure that the necessary pressure is available at the double-acting cylinders of the piston-cylinder units 11, 12 in both cylinder chambers.

The pressure regulating unit 14 and the valve unit 15 are controlled by a numerical control device 16 of the control and/or regulating device 13. The numerical control device 16 comprises a device part 16/1 that is close to the positioning drive and a device part 16/2 that is remote from the positioning drive, and is integrated into a higher-level numerical machine control system 17 of the machine tool 2.

While the device part 16/1 of the numerical control device 16 that is close to the positioning drive is mounted on a carrying structure 18 of the clamping device 1 together with the pneumatic piston-cylinder units 11, 12, the pressure regulating unit 14 and the valve unit 15 of the positioning drive 9, the device part 16/2 that is remote from the positioning drive is located remote from the carrying structure 18 and is separate therefrom. The carrying structure 18 is rotatable in the direction of a double-headed arrow 20 about an axis of rotation 19 of the clamping device 1. The rotary movement of the carrying structure 18 about the axis of rotation 19 is also controlled by the numerical machine control system 17. The clamping jaw pairs 5/1, 5/2 are mutually offset along the axis of rotation 19. The axis of rotation 19 of the carrying structure 18 is cut by the two clamping axes 10/1, 10/2. The axis of rotation 19 of the carrying structure 18 thereby runs through both a clamping centre 21 of the clamping jaw pair 5/1 (FIGS. 5, 6) and a clamping centre 22 of the clamping jaw pair 5/2 (FIG. 4).

A pressure generator 23 (not shown in detail in FIG. 1) of a compressed air supply 24 of the positioning drive 9 is likewise separated spatially from the carrying structure 18 of the clamping device 1. In the case of rotary movements of the carrying structure 18 about the axis of rotation 19, and also in the case of translational movements of the carrying structure 18 along the axis of rotation which are likewise possible, the pressure generator 23 remains stationary. The pressure generator 23 is connected to the pneumatic components of the positioning drive 9 that are seated on the carrying structure 18 by way of rotary feedthroughs of conventional construction (not shown).

FIG. 1 shows the clamping device 1 in an initial state. The clamping chuck 4 is open to the maximum and the mutually associated clamping jaws 5 of the clamping jaw pairs 5/1, 5/2 are spaced apart from one another by the maximum distance along the respective clamping axis 10/1, 10/2. In order to clamp a tube that is to be processed at the laser cutting head 3 of the machine tool 2, the piston-cylinder units 11, 12 of the positioning drive 9 of the clamping device 1 are actuated in a regulated manner, starting from the conditions according to FIG. 1.

Figure 3:
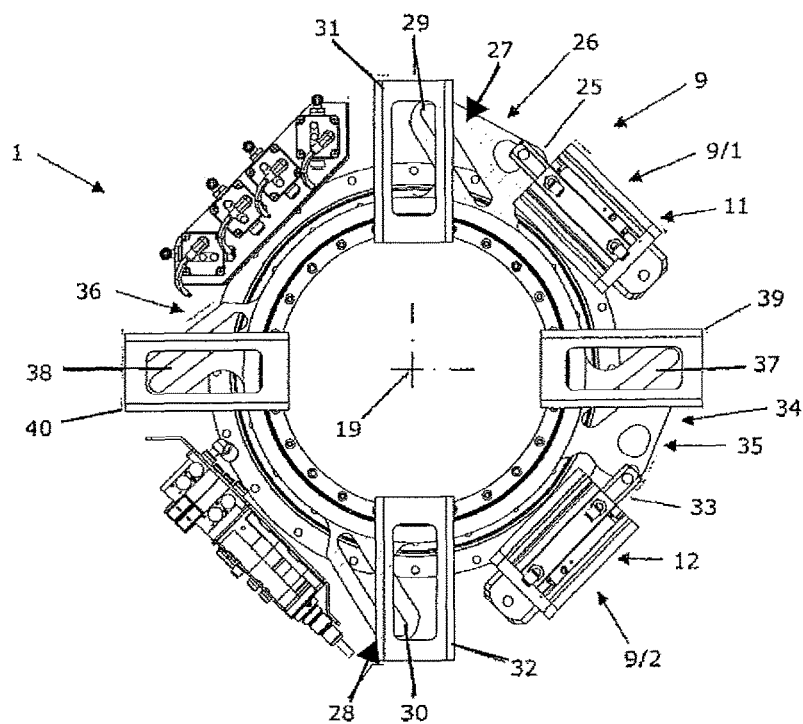
FIG. 3 shows the clamping device according to FIGS. 1 and 2 without clamping jaws.

As can be seen in FIG. 3, a piston rod 25 of the pneumatic piston-cylinder unit 11 is articulated with a first adjusting ring 26. The first adjusting ring 26 is mounted on the carrying structure 18 concentrically with and rotatable about the axis of rotation 19. The point of articulation of the piston rod 25 is located on a connecting member 27 of the first adjusting ring 26. On the first adjusting ring 26, a connecting member 28 is located diametrically opposite the connecting member 27. The connecting member 27 has a connecting-member slot 29 on the adjusting ring side, and the connecting member 28 has a connecting-member slot 30 on the adjusting ring side. A control pin (not shown in the figures) is positively driven in the connecting-member slot 29, which control pin in turn protrudes from the rear side of the guide slide 8 of the upper clamping jaw 5 of the clamping jaw pair 5/1 in the figures. In a corresponding manner, the connecting-member slot 30 of the connecting member 28 guides a control pin (likewise not shown) on the rear side of the guide slide 8 of the lower clamping jaw 5 of the clamping jaw pair 5/1 in the figures.

If the pneumatic piston-cylinder unit 11 is actuated in a regulated manner and the piston rod 25 of the pneumatic piston-cylinder unit correspondingly moves in its longitudinal direction, the first adjusting ring 26, including the connecting members 27, 28 provided thereon, is rotated about the axis of rotation 19 of the carrying structure 18. This is accompanied by a displacement in the connecting-member slots 29, 30 of the control pins provided on the rear side of the guide slides 8 of the clamping jaws 5 of the clamping jaw pair 5/1. This in turn leads to the clamping jaws 5 of the clamping jaw pair 5/1 moving in opposite directions along the clamping axis 10/1. During these movements, the clamping jaws 5 of the clamping jaw pair 5/1 are guided on guide arms 31, 32 of the carrying structure 18.

In a corresponding manner, the clamping jaws 5 of the clamping jaw pair 5/2 are positioned along the clamping axis 10/2.

The pneumatic piston-cylinder unit 12 is to that end articulated with a piston rod 33 on a second adjusting ring 34, which in turn is rotatably seated on the carrying structure 18 and can be rotated about the axis of rotation 19 of the clamping device 1 by the pneumatic piston-cylinder unit 12. Rotary movements of the second adjusting ring 34 are converted by connecting members 35, 36 provided thereon and by control pins, which are provided on the rear side of the guide slides 8 of the clamping jaws 5 of the clamping jaw pair 5/2 and engage in connecting-member slots 37, 38 of the connecting members 35, 36, into linear movements of the clamping jaws 5 of the clamping jaw pair 5/2 in opposite directions along the clamping axis 10/2. Guide arms 39, 40 of the carrying structure 18 serve to guide the clamping jaws 5 of the clamping jaw pair 5/2 along the clamping axis 10/2.

The sequences when clamping a tube that is to be positioned with respect to the laser cutting head 3 of the machine tool 2 are dependent specifically on the particular application.

For the mode of operation of the positioning drive 9, the wall thickness and the resulting wall stiffness of the tube to be clamped and/or its cross-sectional dimensions are of particular significance.

In dependence on the wall stiffness of the tube to be clamped, the device part 16/2 of the numerical control device 16 of the positioning drive 9 that is remote from the positioning drive defines an operating mode for the positioning drive 9, specifically for the pneumatic piston-cylinder units 11, 12. The positioning drive 9, or the piston-cylinder units 11, 12, is/are controlled by the device part 16/1 of the numerical control device 16 that is close to the positioning drive in accordance with this operating mode. The required transmission of control signals between the device part 16/2 of the numerical control device 16 that is remote from the positioning drive and the device part 16/1 of the numerical control device 16 that is close to the positioning drive is effected in the example shown with the aid of a conventional telemetry system and accordingly in a contactless manner.

For the clamping of a thick-walled tube, the device part 16/2 of the numerical control device 16 that is remote from the positioning drive specifies the operating mode "Clamping with maximum force" for the device part 16/1 that is close to the positioning drive. In this operating mode, the positioning drive 9 of the clamping device 1 is solely force-controlled.

On the basis of the mode specified by the device part 16/2 that is remote from the positioning drive, the device part 16/1 that is close to the positioning drive controls the pressure regulating unit 14 and the valve unit 15 of the control and/or regulating device 13 in such a manner that the pneumatic piston-cylinder units 11, 12 are operated with maximum pressure. Consequently, the clamping jaws 5 of the clamping jaw pair 5/1 driven by the pneumatic piston-cylinder unit 11 and the clamping jaws 5 of the clamping jaw pair 5/2 driven by the piston-cylinder unit 12 each move equally quickly at maximum speed from their initial positions according to FIG. 1 in opposite directions towards the clamping centre 21 or the clamping centre 22, respectively. In dependence on the cross-sectional geometry of the tube to be clamped, the clamping jaws 5 of the clamping jaw pair 5/1 contact the tube to be clamped at the same time as the clamping jaws 5 of the clamping jaw pair 5/2 or at a different time. If the clamping jaws 5 of one clamping jaw pair 5/1, 5/2 have reached the outside of the wall of the tube, this becomes noticeable by a pressure increase at the associated pneumatic piston-cylinder unit 11, 12. The pressure at the pneumatic piston-cylinder units 11, 12, which is measured by conventional pressure sensors, is a measure of the amount of force being applied by the mutually opposing clamping jaws 5 of the clamping jaw pair 5/1, 5/2 in question to the outside of the tube to be clamped along the clamping axis 10/1 or the clamping axis 10/2.

As soon as the beginning of a pressure increase is detected at the pneumatic piston-cylinder units 11, 12, the device part 16/1 of the numerical control device 16 that is close to the positioning drive ensures, by appropriately controlling the pressure regulating unit 14 and the valve unit 15, that the pressure at the pneumatic piston-cylinder units 11, 12 increases slowly to a maximum value which is stored in the device part 16/1 that is close to the positioning drive and is dependent on the stiffness of the tube to be clamped. On account of the slow pressure increase at the piston-cylinder units 11, 12, the clamping jaws 5 of the clamping jaw pairs 5/1, 5/2 initially apply only low forces to the tube to be clamped. Consequently, the clamping jaws 5 of each clamping jaw pair 5/1, 5/2 are able to centre the tube along the respective clamping axis 10/1, 10/2 without being impeded by the other clamping jaw pair 5/1, 5/2. The maximum pressure does not build up at the pneumatic piston-cylinder units 11, 12 until the tube to be clamped has been centred along both clamping axes 10/1, 10/2.

On account of the maximum pressure at the pneumatic piston-cylinder units 11, 12, the clamping jaws 5 of the clamping jaw pairs 5/1, 5/2 apply the specified clamping force to the tube arranged between them. If the maximum pressure has been reached at the pneumatic piston-cylinder units 11, 12 and the clamping force has accordingly been reached at the clamping jaws 5 of the clamping jaw pairs 5/1, 5/2, the clamping jaws 5 of the clamping jaw pairs 5/1, 5/2 are in their operational state, in which they clamp the tube in question between them. By moving the clamping device 1 along the axis of rotation 19 and by rotating the clamping device 1 about the axis of rotation 19, the tube secured in the clamping device 1 can then be positioned or moved with respect to the laser cutting head 3 of the machine tool 2.

If the workpiece to be clamped in the clamping device 1 is a thin-walled and consequently easily deformable tube, the numerical machine control system 17, or the device part 16/2 of the numeral control device 16 that is remote from the positioning drive, specifies the operating mode "soft touch" for the positioning drive 9. In this operating mode, the positioning drive 9 can be partially displacement- and thus position-controlled for transferring the clamping jaws 5 of the clamping jaw pairs 5/1, 5/2 into the operational state.

Starting with the initial state of the clamping chuck 4 according to FIG. 1, in the operating mode "soft touch", the pressure regulating unit 14 and the valve unit 15 of the control and regulating device 13 of the positioning drive 9 are initially controlled by the device part 16/1 of the numerical control device 16 that is close to the positioning drive in such a manner that the maximum pressure is present at the pneumatic piston-cylinder units 11, 12 and accordingly the piston rod 25 of the pneumatic piston-cylinder unit 11 and the piston rod 33 of the pneumatic piston-cylinder unit 12, starting from the conditions according to FIG. 3, move out of the respective cylinders at maximum speed. Consequently, the pneumatic piston-cylinder units 11, 12 initially drive the clamping jaws 5 of their associated clamping jaw pairs 5/1, 5/2 towards the clamping centres 21, 22 at a maximum speed. The rapid movement of the clamping jaws 5 of the clamping jaw pairs 5/1, 5/2 ends as soon as the clamping jaws 5 of the individual clamping jaw pairs 5/1, 5/2 have reached a position along the clamping axes 10/1, 10/2 which is stored in the device part 16/1 of the numerical control device 16 that is close to the positioning drive, for example by a teaching operation, and is dependent on the cross-sectional dimensions of the tube to be clamped along the clamping axes 10/1, 10/2. That these clamping jaw positions have been reached is detected by stroke measurement systems of conventional construction (not shown), which are provided on the pneumatic piston-cylinder units 11, 12 and measure the length of extension of the piston rods 25, 33 with respect to the associated cylinder.

The position into which the clamping jaws 5 of the clamping jaw pairs 5/1, 5/2 have moved towards one another at the end of their rapid movement along the clamping axis 10/1 or the clamping axis 10/2 is the respective clamping start position.

In the example shown, when the clamping jaws 5 of the clamping jaw pairs 5/1, 5/2 assume their clamping start position, they are still at a small distance from the outside of the tube to be clamped along the clamping axes 10/1, 10/2. Alternatively, it is possible to choose the clamping start position of the clamping jaws 5 in such a manner that the clamping jaws 5 touch the outside of the tube to be clamped without force but without clearance. In both cases, the movement of the clamping jaws into the clamping start position is solely displacement- or position-controlled.

It is also conceivable that the clamping jaws 5 in the clamping start position apply to the tube to be clamped a low force in the direction of the clamping centres 21, 22. In this case, the movement of the clamping jaws 5 into the clamping start position is already force-controlled. If the pressure at the pneumatic piston-cylinder units 11, 12 reaches the value at which the clamping jaws 5 apply the specified low force to the tube to be clamped, this indicates that the clamping jaws 5 have reached the clamping start position.

If the clamping start position of the clamping jaws 5 is chosen in such a manner that there is still a small clearance along the clamping axes 10/1, 10/2 between the workpiece to be clamped, on the one hand, and the clamping jaws 5, on the other hand, or if the clamping jaws 5 in the clamping start position touch without force but at the same time without clearance the outside of the tube to be clamped, only the subsequent last phase of transferring the clamping jaws 5 into the operational state is force-controlled.

When the clamping jaws 5 have reached the specified clamping start position, the pressure at the pneumatic piston-cylinder units 11, 12 is increased slowly and continuously. If the clamping jaws 5 in the clamping start position are still at a distance from the workpiece to be clamped, the clamping jaws 5 of the individual clamping jaw pairs 5/1, 5/2 move in opposite directions along the clamping axes 10/1, 10/2, as a result of the increase in the pressure present at the pneumatic piston-cylinder units 11, 12, until they come into contact with the outside of the tube to be clamped. A continued pressure increase at the pneumatic piston-cylinder units 11, 12 causes the forces exerted on the tube by the now substantially stationary clamping jaws 5 to increase until the clamping force is reached, the amount of which is stored, in dependence on the stiffness of the tube to be clamped, in the device part 16/1 of the numerical control device 16 that is close to the positioning drive. When the clamping force is reached, or when the pressure associated with the clamping force is reached at the pneumatic piston-cylinder units 11, 12, the clamping jaws 5 are in the operational state and the positioning drive 9 of the clamping device 1 is stopped.

If, in the clamping start position, the clamping jaws 5 are already touching the outside of the tube to be clamped without force or with the exertion of a low force, a pressure increase at the piston-cylinder units 11, 12 immediately causes the build-up of or an increase in the force exerted on the tube to be clamped by the clamping jaws 5 along the clamping axes 10/1, 10/2. In these cases too, the positioning drive 9 is shut down as soon as the pressure sensors at the pneumatic piston-cylinder units 11, 12 detect that the pressure associated with the clamping force has been reached.

Figure 7:
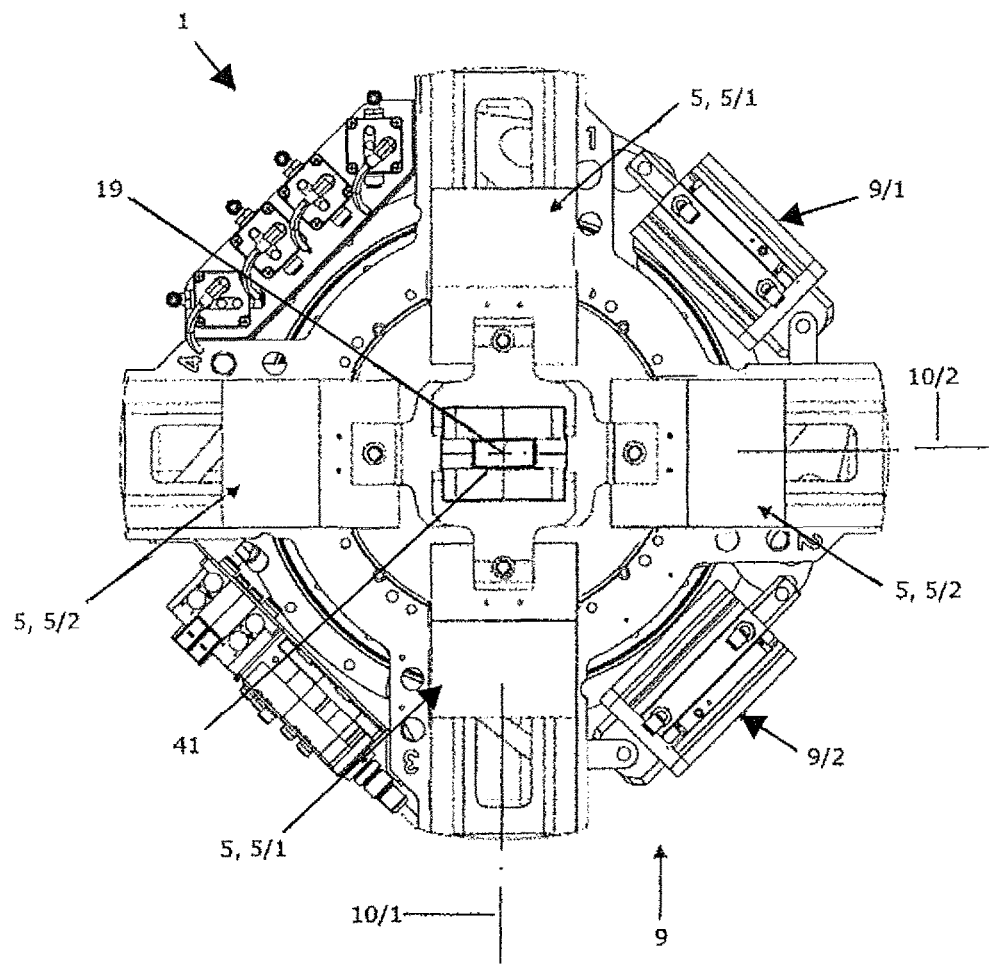
FIG. 7 shows the clamping device according to FIGS. 1 to 6 with the clamping chuck in an operational state.

FIG. 7 shows the clamping device 1 with the clamping jaws 5 transferred into the operational state. The clamping jaws 5 of both clamping jaw pairs 5/1, 5/2 each apply the specified clamping force to a tube 41, which is not shown in detail. The tube 41 has a point-symmetrical rectangular cross-section, the longitudinal axis of the tube running through the centre of symmetry thereof. The longitudinal axis of the tube coincides with the axis of rotation 19 of the clamping device 1.

A number of embodiments of the invention have been described. Nevertheless, it will be understood that various modifications may be made without departing from the spirit and scope of the invention. Accordingly, other embodiments are within the scope of the following claims.

What is claimed is:

1. A workpiece clamping device, comprising:
   a carrying structure;
   two clamping elements forming a clamping element pair and being located opposite one another on the carrying structure, wherein each of the clamping elements is provided with a guide slide and wherein each of the guide slides is guided on a guide arm of the carrying structure along a clamping axis and has a control pin protruding from a rear side of the guide slide; and
   a servo drive that forms a positioning drive having:
      a drive motor mounted on the carrying structure;
      an adjusting ring that is rotatably mounted on the carrying structure and has two connecting members located diametrically opposite one another on the adjusting ring, each of the connecting members having a connecting member slot extending along the clamping axis and each of the connecting member slots guiding the control pin provided on the guide slide of one of the clamping elements along the clamping axis; and
      a numerical control device configured to control the drive motor of the servo drive to rotate the adjusting ring including the connecting member slots and to thereby displace the control pins that are guided in the connecting member slots, the guide slides from which the control pins protrude, and the clamping elements provided with the guide slides, synchronously and in opposite directions along the clamping axis, such that the clamping elements thus are positioned relative to one another along the clamping axis,
   wherein the drive motor of the servo drive is controlled by the numerical control device to:
      first move the clamping elements toward one another into a pre-determined clamping start position in which the clamping elements are positioned on opposite sides of a workpiece arranged therebetween and in which the clamping elements do not apply a force to the workpiece or apply a force to the workpiece that is smaller than a clamping force that is pre-determined based on a stiffness of the workpiece,
      subsequently urge the clamping elements toward one another from the pre-determined clamping start position to an operational state, in which the clamping elements apply the pre-determined clamping force to the workpiece, and
      when the force applied by the clamping elements on the workpiece reaches the pre-determined clamping force, stop moving the clamping elements.

2. The workpiece clamping device of claim 1, wherein the clamping elements are positioned such that, in the operational state, the clamping elements are located opposite one another on the opposite sides of the workpiece and each apply a respective clamping force to the respective side of the workpiece along a line of application of the respective clamping force, and such that, when the clamping elements are in the clamping start position, any force applied by the clamping elements along the line of application of the respective clamping force is less than the respective clamping force in the operational state.

3. The workpiece clamping device of claim 1, wherein the clamping elements are arranged to define a clearance between the clamping elements and the workpiece in the clamping start position, and
   wherein the servo drive is operable to move the clamping elements toward one another from the clamping start position into an operational position associated with the operational state.

4. The workpiece clamping device of claim 3, wherein the servo drive is configured to move the clamping elements into the clamping start position at a higher speed than from the clamping start position into the operational position.

5. The workpiece clamping device of claim 1, wherein the servo drive includes a device controller responsive to at least one of the force applied by the clamping elements to the workpiece or the position of the clamping elements during a relative movement of the clamping elements into an operational position associated with the operational state and configured to move the clamping elements as a function of the at least one of the force or the position.

6. The workpiece clamping device of claim 1, wherein the carrying structure is rotatable about an axis of rotation.

7. The workpiece clamping device of claim 6, wherein the servo drive includes a servomotor supported on the rotatable carrying structure.

8. The workpiece clamping device of claim 1, wherein the servo drive includes a pneumatic servo drive with a pneumatic servomotor as the drive motor, and wherein the pneumatic servomotor includes a pneumatic piston-cylinder unit.

9. The workpiece clamping device of claim 8, wherein the servo drive includes a pressure regulating unit and a valve unit that are configured to control a pressure in a chamber of a cylinder of the pneumatic piston-cylinder unit, and
   wherein the numerical control device is configured to control the pressure regulating unit and the valve unit.

10. The workpiece clamping device of claim 1, wherein data indicative of the clamping start position of the clamping elements is stored in the numerical control device.

11. The workpiece clamping device of claim 1, wherein the numerical control device includes a first part that is close to the servo drive and a second part that is remote from the servo drive, and
   wherein the second part of the numerical control device defines at least one operating mode in accordance with which the first part of the numerical control device controls the servo drive for at least one of moving the clamping elements into the clamping start position and transferring the clamping elements into the operational state.

12. The workpiece clamping device of claim 11, wherein the at least one operating mode includes at least one of a force-controlled mode and a displacement- and thus position-controlled actuation of the clamping elements of the clamping device.

13. The workpiece clamping device of claim 11, wherein the clamping elements are configured to clamp a workpiece in the form of a tube, and wherein the at least one operating mode is defined based on a wall stiffness of the tube resulting from a wall thickness of the tube.

14. The workpiece clamping device of claim 13, wherein the workpiece clamping device is configured for clamping a thick-walled tube, by the second part of the numerical control device being configured to define a force-controlled mode for the first part of the numerical control device, in which the servo drive is force-controlled.

15. The workpiece clamping device of claim 13, wherein the workpiece clamping device is configured for clamping a thin-walled tube, by the second part of the numerical control device being configured to define a displacement- and thus position-controlled mode for the first part of the numerical control device, in which the servo drive is displacement- and thus position-controlled.

16. A workpiece processing system, comprising:
a workpiece processing device; and
a workpiece clamping device comprising:
   a carrying structure;
   two clamping elements forming a clamping element pair and being located opposite one another on the carrying structure, wherein each of the clamping elements is provided with a guide slide and wherein each of the guide slides is guided on a guide arm of the carrying structure along a clamping axis and has a control pin protruding from a rear side of the guide slide; and
   a servo drive that forms a positioning drive having:
      a drive motor mounted on the carrying structure;
      an adjusting ring that is rotatably mounted on the carrying structure and has two connecting members located diametrically opposite one another on the adjusting ring, each of the connecting members having a connecting member slot extending along the clamping axis and each of the connecting member slots guiding the control pin provided on the guide slide of one of the clamping elements along the clamping axis; and
      a numerical control device configured to control the drive motor of the servo drive to rotate the adjusting ring including the connecting member slots and to thereby displace the control pins that are guided in the connecting member slots, the guide slides from which the control pins protrude, and the clamping elements provided with the guide slides, synchronously and in opposite directions along the clamping axis, such that the clamping elements thus are positioned relative to one another along the clamping axis,
      wherein the drive motor of the servo drive is controlled by the numerical control device to:
         first move the clamping elements toward one another into a pre-determined clamping start position in which the clamping elements are positioned on opposite sides of a workpiece arranged therebetween and in which the clamping elements do not apply a force to the workpiece or apply a force to the workpiece that is smaller than a clamping force that is pre-determined based on a stiffness of the workpiece,
         subsequently urge the clamping elements toward one another from the pre-determined clamping start position to an operational state, in which the clamping elements apply the clamping force to the workpiece, and
         when the force applied by the clamping elements on the workpiece reaches the pre-determined clamping force, stop moving the clamping elements.

17. The workpiece processing system of claim 16, further comprising a numerical machine control system remote from the servo drive, wherein the numerical control device of the servo drive includes a first part that is relatively close to the servo drive and a second part that is relatively remote from the servo drive, and wherein the second part of the servo drive is integrated into the numerical machine control system.

18. The workpiece clamping device of claim 11, wherein an amount of the clamping force is stored in the first part of the numerical control device.

19. The workpiece clamping device of claim 11, wherein the movement of the clamping elements into the pre-determined clamping start position is controlled based on a distance and a force between the clamping elements and the workpiece when the clamping elements are moved into the pre-determined clamping start position.

20. The workpiece clamping device of claim 19, wherein the clamping start position is pre-determined such that, when the clamping elements are in the clamping start position, there is a clearance between the clamping elements and the workpiece, or such that the clamping elements touch an outside of the workpiece without force and without clearance, and
   wherein the servo drive is configured such that the movement of the clamping elements into the clamping start position is displacement- or position-controlled.

21. The workpiece clamping device of claim 19, wherein the clamping start position is pre-determined such that, when the clamping elements are in the clamping start position, the clamping elements apply a force to the workpiece that is smaller than the pre-determined clamping force, and
   wherein the servo drive is configured such that the movement of the clamping elements into the clamping start position is force-controlled.

22. The workpiece clamping device of claim 13, wherein the at least one operating mode is defined further based on cross-sectional dimensions of the tube.

* * * * *